Patented Apr. 22, 1930

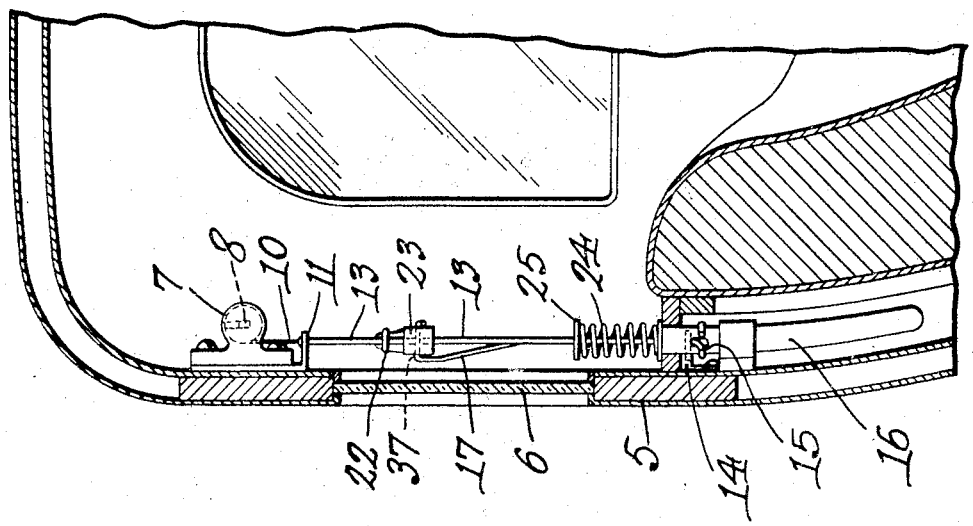
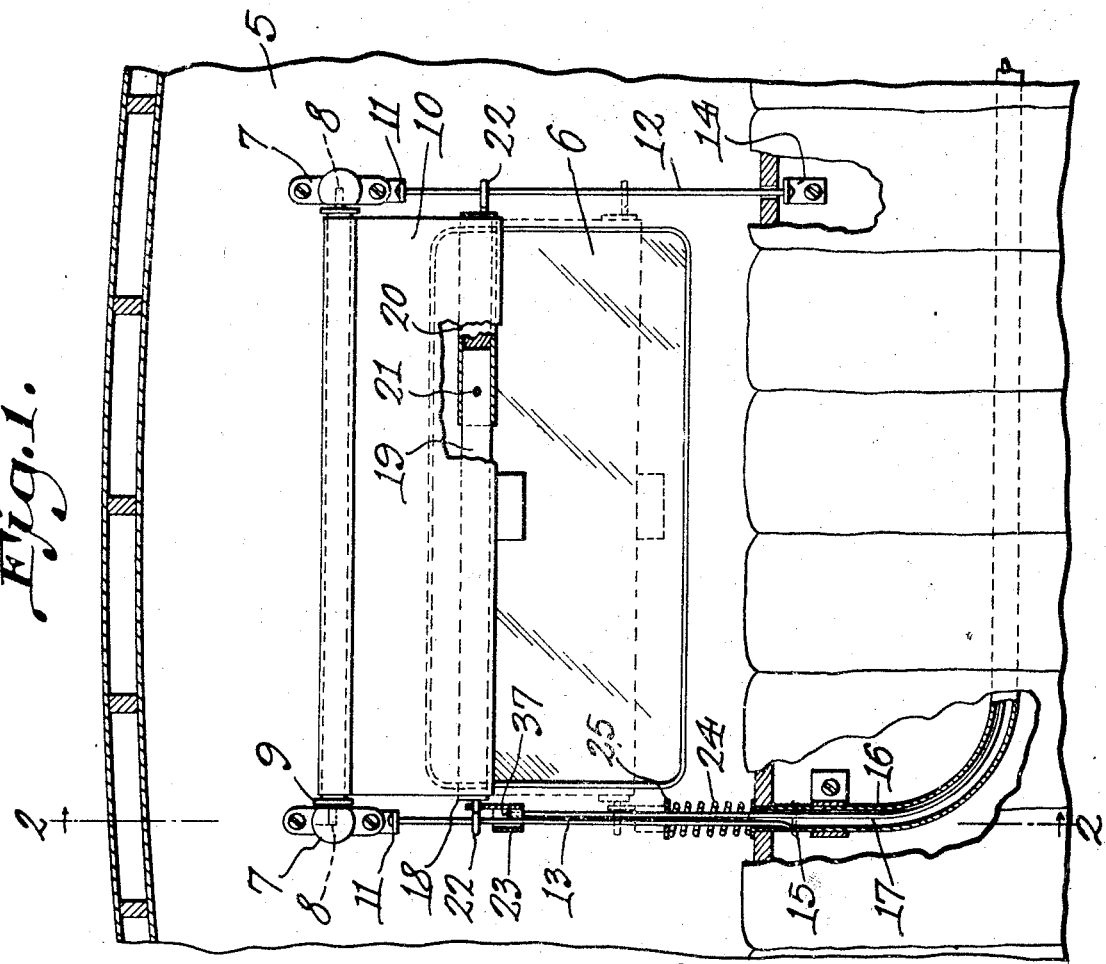

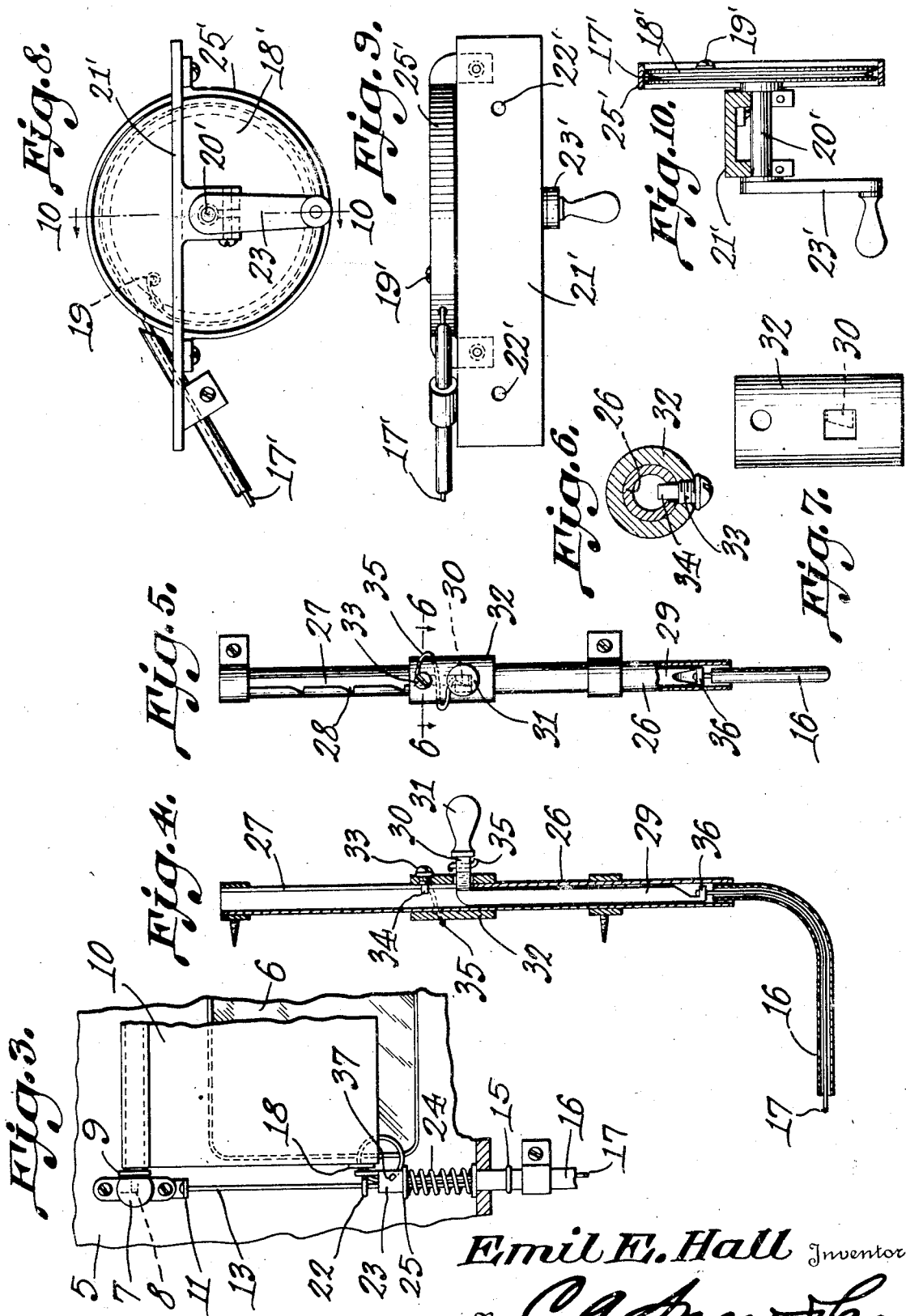

1,755,734

UNITED STATES PATENT OFFICE

EMIL EDWARD HALL, OF GROTON, CONNECTICUT

MOTOR-VEHICLE REAR-CURTAIN OPERATOR

Application filed July 22, 1929. Serial No. 380,230.

This invention relates to motor vehicles, and aims to provide novel means whereby the rear curtain of the vehicle may be operated by a person seated in the operator's seat.

The primary object of the invention is to provide a device of this character which may be readily and easily moved to its active or inactive position at the will of the operator to prevent light rays from vehicles approaching at the rear, from blinding the operator to render driving difficult.

A further object of the invention is the provision of an operating means which will permit the curtain to be adjusted by persons on the rear seat of the vehicle without the use of the operating mechanism.

A still further object of the invention is to provide a device of this character which may be readily and easily installed in motor vehicles now in use, eliminating the necessity of making extensive alterations in the construction of the vehicle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a sectional view through a vehicle, illustrating a rear curtain as equipped with an operating mechanism forming the subject matter of the present invention.

Figure 2 is a sectional view taken on line 2—2 of Figure 1.

Figure 3 is a fragmental detail view showing the curtain in a partially closed position.

Figure 4 is a longitudinal sectional view through one form of the operating means.

Figure 5 is a front elevational view thereof.

Figure 6 is a sectional view taken on line 6—6 of Figure 5.

Figure 7 is an elevational view of the locking sleeve.

Figure 8 is an elevational view of a modified form of operating mechanism.

Figure 9 is a plan view thereof.

Figure 10 is a sectional view taken on line 10—10 of Figure 8.

Referring to the drawings in detail, the body of a motor vehicle is indicated by the reference character 5 and is shown as provided with the usual rear window 6. The reference character 7 designates brackets which are formed with bearings to receive the pintles 8 of the curtain roller 9 on which the curtain 10 is wound.

Ears 11 extend at right angles to the brackets 7 and are provided with openings to receive the rods 12 and 13 respectively, the rod 12 having its lower end secured to the bracket 14 concealed under the upholstery in the rear seat of the vehicle.

The rod 13 which is secured to the ear 11 at the opposite side of the curtain, has its lower end formed into a loop 15, which encircles the upper end of the tube 16 that provides a guide for the operating wire 17. The curtain stick 18 which is positioned in a pocket formed at the lower end of the curtain 10, embodies a main portion 19 and a tubular portion 20 that slides under one end of the main portion 19 where it is secured by means of the pins 21, the tubular member 20 being filled with lead to weight this side of the curtain, for purposes to be hereinafter more fully described.

At the ends of the curtain stick are eyes 22 that accommodate the rods 12 and 13, the rods 12 and 13 acting as guides to cause the curtain 10 to move in a true vertical line, and at the same time prevent flapping of the curtain.

Secured to one end of the curtain stick, is a guide piece 23 that moves over the rod 13, the guide piece providing means to which the operating wire 17 is connected so that movement of the wire 17 will act to move the curtain 10 to its open or closed position. Resting on the upper end of the tube 16, and surrounding the rod 13, is a coiled spring 24 which is provided with a washer 25 at its upper end. This washer 25 acts as a stop for the guide piece 23 when the wire 17 has been pulled, and prevents the curtain from being pulled too far so that the curtain may be pulled against the tension of the spring 24 to release the pawl forming a part of the usual curtain roller, when it is desired to move the curtain to its inactive position.

The tube 16 is shown as extending along the back of the rear seat and within the frame of the vehicle, from where it extends along the side of the car and is connected with the tube 26 secured adjacent to the operator's seat.

This tube 26 is formed with an elongated opening 27, one wall thereof having notches 28. Movably supported within the tube 26 is an operating rod 29 that has a right angled extremity 30 terminating in a handle piece 31. A sleeve 32 is mounted for sliding movement over the tube 26 and is provided with a screw 33 that has an extension 34 moving in the elongated opening 27. The sleeve 32 is provided with an opening through which the right angled extremity 30 of the rod 29 extends, the opening being appreciably larger than the right angled extremity 30, so that the right angled extremity 30 may move within the opening to position itself in the notches 28 to hold the curtain in its positions of adjustment.

A coiled spring 35 connects with the screw 33 at one of its ends, the opposite end thereof having connection with the right angled portion 30 of the rod 29 so that a lateral pressure will be exerted on the extremity 30, to urge the extremity 30 into the notches, after the handle piece 31 has been released by the operator.

One end of the wire 17 connects with the rod 29, at 36, the opposite end of the wire being connected to the member 23, at 37, so that when the curtain is pulled downwardly by a person sitting on the rear seat, to operate the curtain in the usual manner, the wire 17 will buckle, allowing the curtain to move independently of the wire 17, as shown by Figure 3 of the drawings.

In the form of the invention as illustrated by Figure 8, the operating wire 17′ is shown as wound around the pulley 18′, which is provided with a grooved periphery to receive the wire 17′, it being understood that one end of the wire 17′ is secured to the pulley at 19′.

In order to insure a true operation of the wire 17′, the groove in the periphery of the pulley 18′ is preferably V shaped to cause a binding action between the wire and pulley. The pulley 18′ is mounted on one end of the shaft 20′, which shaft is supported in bearings depending from the bar 21′, the bar being provided with openings 22′ to receive securing screws so that the operating device may be securely fastened under the instrument board of a motor vehicle.

Surrounding the pulley 18′ is a curved guard 25′ which is provided with an opening through which the wire 17′ extends so that the wire 17′ will be fed evenly on the pulley, eliminating any possibility of the wire buckling to defeat the purpose of the invention.

Mounted on one end of the shaft 20′ is a crank handle 23′ which is disposed in proximity to the operator's seat, so that the operator may have easy access thereto to operate the wire 17′ and move the curtain to its active or inactive position.

I claim:

1. An operating mechanism for the rear curtain of a motor vehicle, comprising guide rods, said curtain having a stick having eyes at its ends operating over the rods, a guide piece connected with one end of the curtain stick, a coiled spring in the path of travel of the guide piece to engage the guide piece to restrict downward movement of the guide piece, and a wire attached to the guide piece for moving the guide piece downwardly.

2. An operating mechanism for the rear curtain of a motor vehicle, including a tube having one end disposed adjacent to the curtain, the opposite end thereof being disposed adjacent to the operator's seat, a tube arranged adjacent to the operator's seat and connected with the first mentioned tube, the last mentioned tube having an elongated cut out portion, one wall thereof having notches, a sleeve on the last mentioned tubular member, means for preventing rotary movement of the sleeve, a rod extended through the last mentioned tubular member and through the sleeve, a spring connected with the sleeve and with the rod to urge the rod in a lateral direction to cause the rod to move into a notch, and a wire extending through the tubular members and connected with the curtain and operating rod to move the curtain to its closed position.

In testimony that I claim the foregoing as my own, I have hereto affixed my signature.

EMIL EDWARD HALL.